United States Patent [19]

Kropp

[11] 4,418,816
[45] Dec. 6, 1983

[54] INERTIAL CONVEYOR

[76] Inventor: Lev Kropp, 2178 W. Marne Ave., Milwaukee, Wis. 53209

[21] Appl. No.: 312,399

[22] Filed: Oct. 19, 1981

[51] Int. Cl.³ ............................................. B65G 25/00
[52] U.S. Cl. .................................... 198/773; 110/268; 110/281
[58] Field of Search ....................... 198/741, 750, 773; 110/278, 279, 281, 285, 101 A; 34/164

[56] References Cited

U.S. PATENT DOCUMENTS

| 449,157 | 3/1891 | Gow | 110/285 |
|---|---|---|---|
| 1,849,791 | 3/1932 | Curtner et al. | 198/750 X |
| 2,033,576 | 3/1936 | Hofft | 110/39 |
| 2,282,713 | 5/1942 | Eske | 110/37 |
| 2,289,942 | 7/1942 | Tafel | 198/750 X |
| 2,534,634 | 12/1950 | Sparks | 110/37 |
| 2,559,541 | 7/1951 | Martin | 198/741 |
| 3,405,821 | 10/1968 | Slesaczek et al. | 214/26 |
| 3,703,861 | 11/1972 | Slack et al. | 34/164 X |
| 3,945,513 | 3/1976 | Scheffler | 214/23 |
| 4,200,047 | 4/1980 | Knorr | 110/281 |
| 4,250,818 | 2/1981 | Sigg | 110/278 |
| 4,285,713 | 8/1981 | Wilkuski | 65/27 |

Primary Examiner—John J. Love
Assistant Examiner—Paul A. Sobel
Attorney, Agent, or Firm—Quarles & Brady

[57] ABSTRACT

An inertial conveyor has at least one transporting surface or section slidably arranged on rails with the rear end of the section sliding over an immovable rest, shifting means, preferably an adjustable spring, which permits the section to shift toward the rest and drive means for delivering lateral driving impulses of acceleration in one direction with an acceleration which is more than the acceleration of the friction force of any material on the surface to the section. The shifting means in between the driving impulses delivering lateral movement to the section in the opposite direction with less acceleration than that of material thus causing a non-harmonic movement so that the friction force will be overcome and material on the surface will move toward the immovable rest. In a preferred embodiment the inertial conveyor includes a plurality of sections and is part of a grate stoker.

4 Claims, 6 Drawing Figures

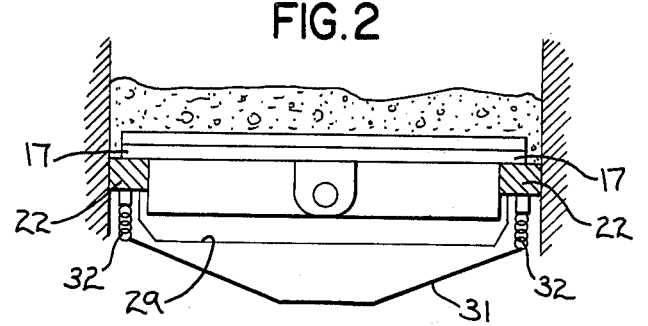
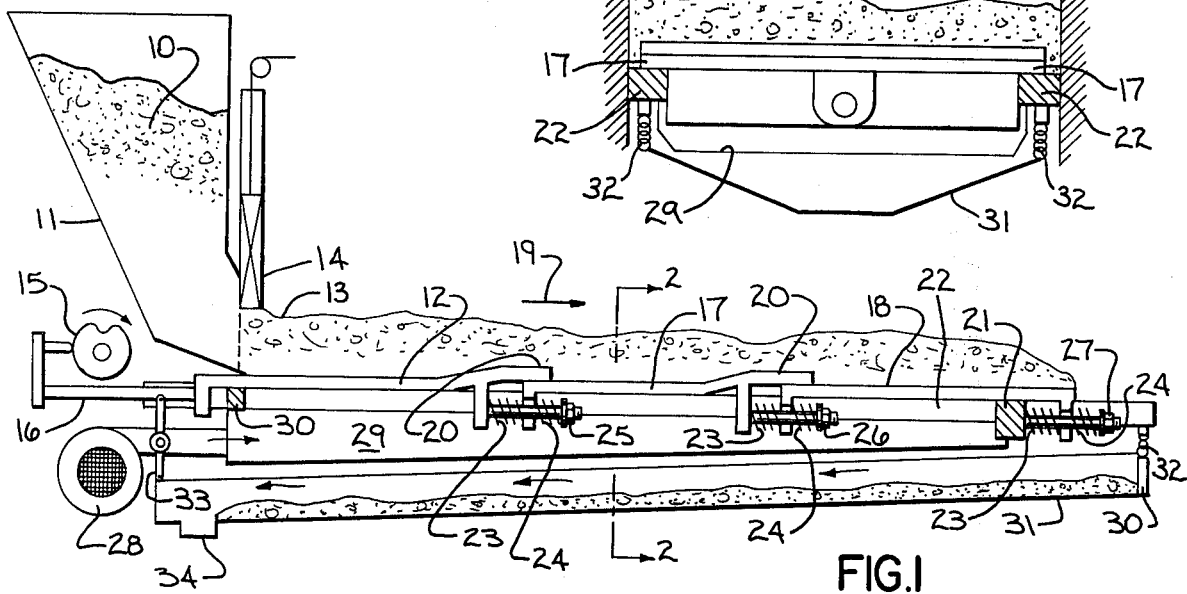
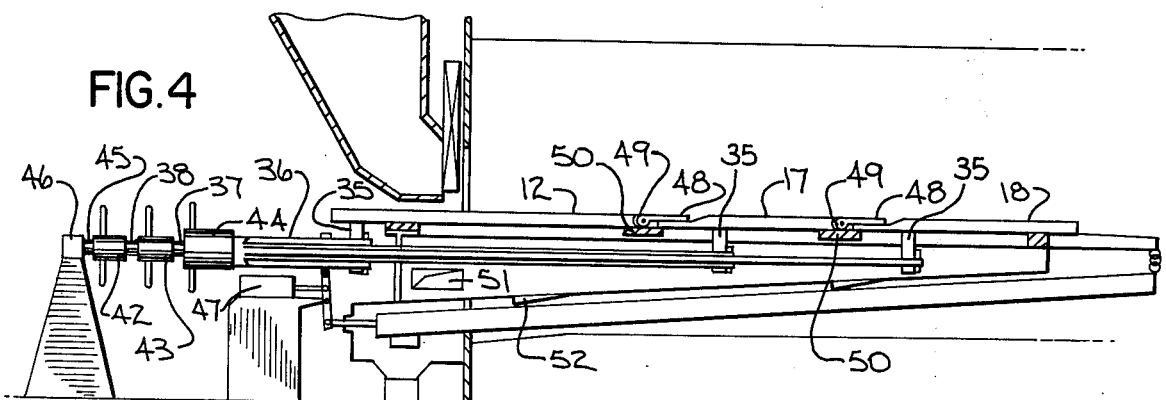
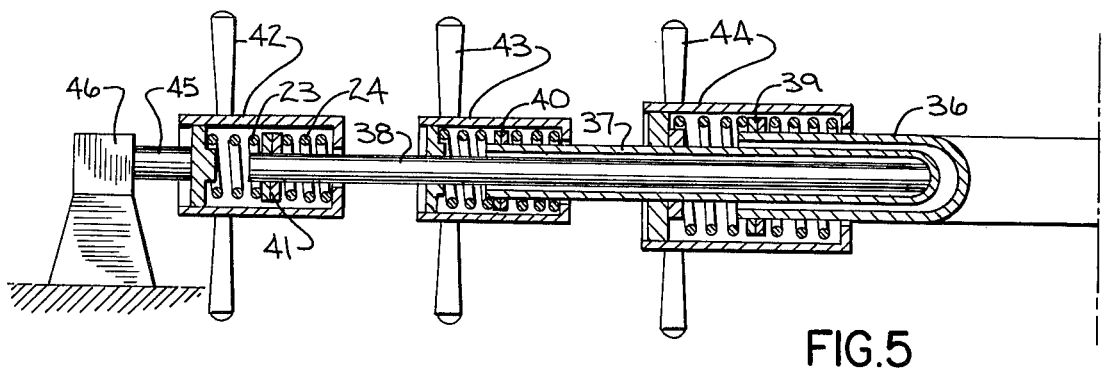

the layer thickness on both sections 17 and 18. Proper

INERTIAL CONVEYOR

This invention relates to an inertial conveyor, and more particularly to an inertial conveyor for use in a grate stoker for solid fuels.

BACKGROUND OF THE INVENTION

A requirement exists for a simple reliable and compact conveyor with a variety of applications, which can be applied for example, as a grate stoker installed in furnaces having a limited height (particularly, in firetubes). Conventional grate stokers: chain grates, sprinkler stokers, overfeed, underfeed, and even vibrating stokers fail to meet this condition. In most cases there is also no possibility to change the profile and distribution of fuel and ash layer on the grate without manual interference.

SUMMARY OF THE INVENTION

It is an object of the invention to disclose an inertial conveyor of general use and particularly suited for use in a grate stoker.

A further object of the invention is to provide a compact inertial conveyor stoker with a plurality of sections in the conveying direction.

A further object of the invention is to provide an inertial conveyor in which the thickness of a material layer on each section can be changed by a distant control.

Another object of the invention is to provide a grate stoker that can effectively utilize a wide range of solid fuels, including caking coals.

A still further object of the invention is to provide a grate stoker in which the main operations; fuel feeding and distribution, cakes destroying, ash and downfall removal, are fully mechanized.

Also an object of the invention is to provide a simple solenoid drive for the inertial conveyor.

In its broadest embodiment the invention is an inertial conveyor comprising a transporting surface slidably arranged on rails with one end of said surface on an immovable rest, shifting means permitting said surface to shift toward the immovable rest, and drive means for delivering to said surface lateral driving impulses of acceleration in one direction with acceleration which is more than the accleration of the friction force of any material on the surface, said shifting means in between said impulses delivering lateral movement to the surface in an opposite direction thus creating a non-harmonic movement, so that said force will be overcome by said driving impulses and material on the surface will move along the surface toward the immovable rest.

The essence of the invention may be better understood in the preferred embodiment in which the conveyor is incorporated in a grate stoker.

According to the invention there is provided a grate stoker which has a fuel bin with a guillotine regulator of fuel layer thickness, and an improved inertial conveyor which has a plurality of consecutive fire-bar sections, resting by gravity on rails, placed on each side of the furnace, which sections can slide along the rails. The rear end of each section covers the front end of the next one. Each previous section is separated from the next one by shifting means, preferably springs which are adjustable independently and permit the sections to shift toward each other. The same kind of adjustable springs are placed between the last section and an immovable rest. The first section is connected through a pilot rod to a drive means such as a rotating cam, an eccentric, a solenoid or some other device that can deliver to the pilot rod and to the conveyor during impulses of a certain shape, described further.

For other applications, it may be desirable to employ a conveyor with a single transporting surface or section.

The above and other objects and advantages of the invention will be apparent from the following description of the preferred embodiments taken in conjunction with the accompanying drawings:

BRIEF DESCRIPTION OF THE DRAWINGS

In the drawings

FIG. 1 is a schematic longitudinal view of a stoker with a conveyor having three sections;

FIG. 2 is a view along line 1—1 of FIG. 1;

FIG. 4 is a longitudinal view of another embodiment of the invention;

FIG. 5 is a detailed view of layer thickness distant control device; and

DESCRIPTION OF THE PREFERRED EMBODIMENT

Figure 3:
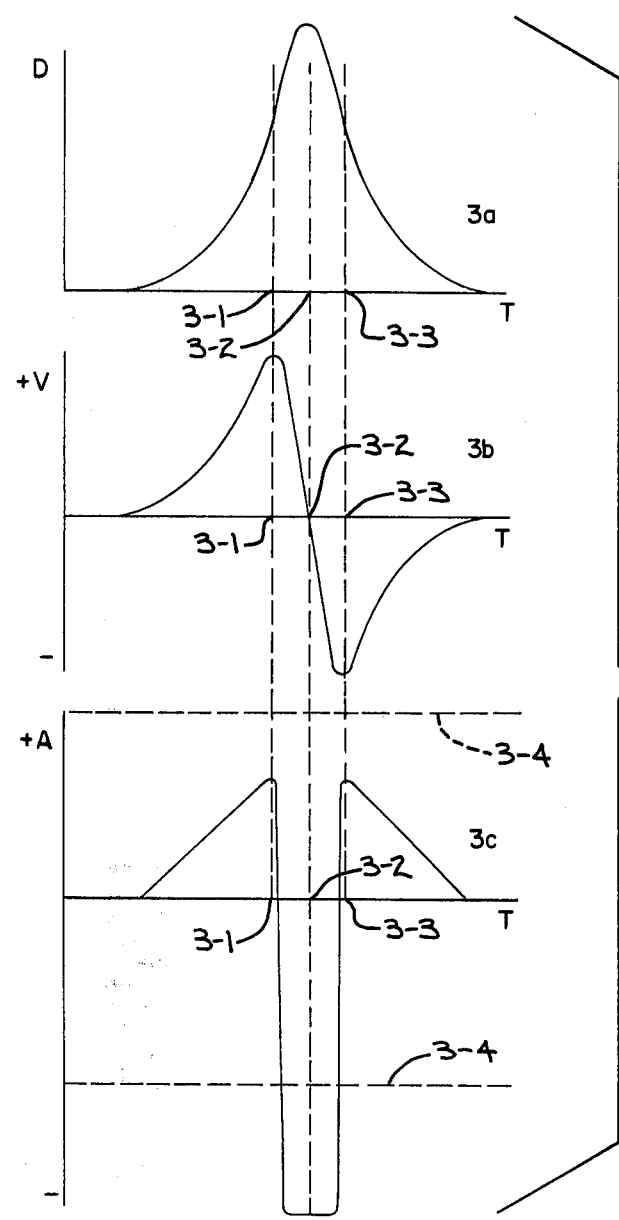
FIG. 3 is a set of curves, showing the shape of a single impulse; distance, velocity and acceleration per time unit.

As shown in FIG. 1, solid fuel 10 from a bin 11 enters by gravity on a first fire-bar section 12. Initial thickness of fuel layer 13 is established by a guillotine regulator 14. In the embodiment of FIG. 1 the conveyor of the stoke has two additional sections 17 and 18. Longitudinal impulses, the nature and form of which will be described further, are transferred to the first section 12 from the stoker drive 15 through the pilot rod 16. These impulses force the fuel to move by inertia in the direction shown by the arrow 19. To prevent fuel downfall between sections, the ends 20 of the sections 12 and 17 cover the beginning of the next section. The end of the last section 18 extends over a rear crossbeam or immovable rest 21.

As seen in FIG. 2, on both sides of the furnace all of the sections rest and slide on rails 22 which help prevent forced air from escaping from below.

Returning to FIG. 1, it can be seen that each of the sections is separated from a following section by the intermediate springs 23 that are intended for alteration of impulsed amplitude on the last and intermediate sections. The dumping springs 24 serve for shock absorption. The tension of springs 23 and 24 may be adjusted with a nut 25, 26 or 27 accordingly. When all the nuts are tightened, the conveyor of stoker cannot move and doesn't work. However, by loosening the nut 27 of the last section 18 the amplitude of the impulses on all the sections will be uniform and maximum. If the nut 26 of the second section 17 is loosened, both the first section 12 and the second section 17 will work with full amplitude, while the last section 18, will work with partial amplitude, which will cause retardation of the fuel layer movement on section 18 and the corresponding increase of the layer thickness. On the other hand, tightening the nut 26 will cause an increase in the amplitude on the last section 18, the velocity of the layer movement will be enhanced and the layer thickness decreased. In a similar manner, by tightening the nut 25 it is possible to change selection of the spring tension for each section makes possible the layer control on all of the sections, making each of them virtually a combustion zone.

Forced air from a fan 28 flows to common air plenum 29 under the grate. The air-tightness of the plenum is determined by the nature of its connection to the front 30 and rear 23 crossbeams and to the side rails 22 as seen in FIG. 2.

Slag from the last section 18 falls on ash trough 31, suspended on hangers 32 and a swinging lever 33. The lever 33 which is connected to the pilot rod 16 transmits to the ash trough 31 driving impulses in counter phase, forcing slag to move in the direction of the furnace front and to unload at opening 34.

In FIG. 3 there are shown curves, illustrating the nature and shape of a single impulse. The curve 3a characterizes distance which a section goes through in a time unit, the curve 3b—alteration of the section velocity and the curve 3c—acceleration. It can be seen, that while a section begins to move forward, its velocity increases gradually. Then in a moment of time 3-1 the acceleration changes the sign and increases sharply on its absolute magnitude, which should exceed the magnitude of the layer-section surface resting friction force acceleration 3-4. This forces the section to stop in a moment 3-2, while particles on the section continue their movement forward by inertia since they lose their cohesion with the surface. The force causing the negative acceleration continues its influence on the section, causing it to begin to move in the opposite direction, which increases additionally the distance the particles shift. In a moment 3-3 the acceleration decreases and again changes its sign. It is very important that acceleration of the section in a positive direction should never exceed the magnitude of the acceleration of the particles layer friction force towards the section surface. The positive acceleration curve should be shaped so as to speed up and impede the section smoothly. In contrast to prior art conveyors, the movement of the conveyor of the present invention is non-harmonic and without a vertical component.

To vary the furnace capacity, any of the following parameters can be controlled; frequency or amplitude of the impulses, the magnitude of the negative acceleration and the duration of its influence. With any kind of drive-cam, eccentric, solenoid, etc., ways to change these parameters are known. To insure complete removal of ashes even on a small load, an ash trough 31 of the proper capacity is selected.

In FIG. 4 and FIG. 5 is shown another embodiment of the invention in which all springs and devices for their control are located out of the heating zone of the furnace. In this embodiment each section of the conveyor has a lug 35 on its bottom side to which a pipe 36, 37 and 38 is fixed. These pipes are placed each inside of each other, making a telescope system, so that the external pipe 36 is connected to the first section 12, and the internal pipe (or rod) 38 to the last section 18. On the free ends of the pipes there are circular flanges 39, 40 and 41. On each side of each flange there is placed a spring 23 or 24. The springs 23, 24 are compressed by adjusting chucks 42, 43 and 44. The chucks 44 and 43 of the first and intermediate sections 12 and 17 are screwed onto bushes, which are welded to the pipes 38 and 37, respectively, while the chuck 42 of the last section is screwed onto a bushing, which is welded to a thrust rod 45. This rod is fixed on an immovable rest 46. All the chucks are supplied with handles for rotation to control the handle movement of the sections in the same way as the adjustable nuts in the embodiment of FIG. 1.

In FIG. 4 the stoker is driven by an electromagnetic solenoid 47 that can be controlled by an electrical impulse generator. The impulse generator also may be electronic or electro-mechanical and any other suitable device may be used. A possible arrangement of the electro-mechanical solenoid control is shown further. Other kinds of drives also can be applied, for example, pneumatic or hydraulic.

In the embodiment of FIG. 4 the rear ends of sections 12 and intermediate section 17 are supplied with swinging peaks 48 attached to the sections by hinges 49. The peaks 48 cover the front ends of the next sections to prevent fuel downfall. For the same purpose and to reduce the escape of forced air intermediate packing bars 50 are provided. The air plenum in the embodiment of FIG. 4 has no forced draft compartments with control dampers since the possibility of regulating the fuel layer thickness separately on each section permits the operator to alter the combustion air supply in each combustion zone without changing the air pressure under the grate. This simplifies the furnace design, solves the problem of air overflow from zone to zone and gives the possibility of reducing furnace sizes. Forced air comes to the plenum through the opening 51. The downfall removal from the plenum is accomplished by periodically opening the lids 52. In this manner the fuel downfall is blown out to the ash trough by forced draft air. It also is possible to remove the downfall by washing it to an ash tray or into a slag sump.

Figure 6:
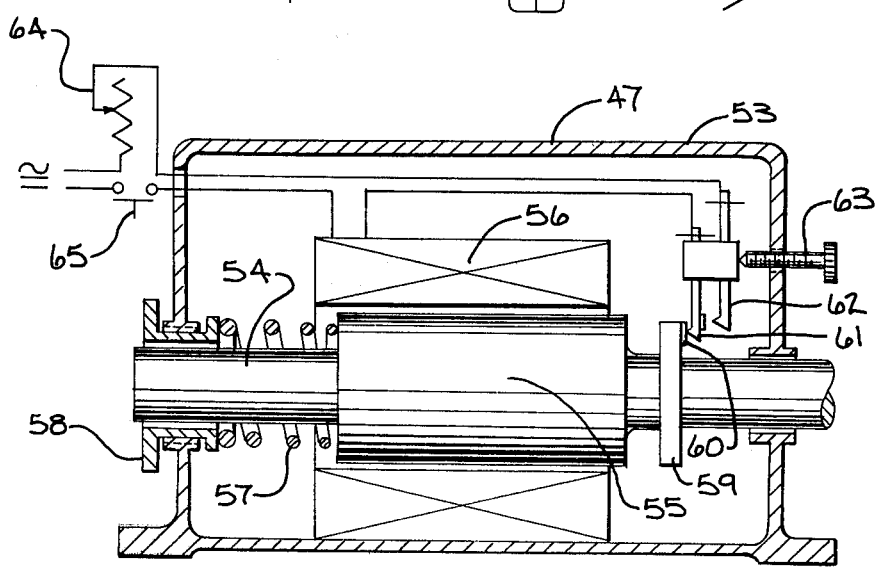
FIG. 6 is a section of a solenoid drive.

FIG. 6 shows a suitable solenoid drive 47. As seen therein, the solenoid drive 47 consists of an immovable casing 53 in which an armature 54, consisting of a metallic shaft, and a magnetic core 55, can shift axially. The core 55 is surrounded by a magnetic coil 56 that is fed with electric current. On one side of the core 55 a spring 57 is installed about the shaft 54. The thrust of the spring 57 is changeable with tension; the more the spring is compressed, the more the thrust gain increases. This can be achieved, for example, by making the spring of a rod of a variable cross section. The compression of the spring can be adjusted by a threaded bush 58. The tension of the spring should be sufficient to compress the grate sections springs 23 and 24 (see FIGS. 1, 4 and 5), so that the conveyor moves in the passing direction with an acceleration smaller than the acceleration of the layer-surface friction force. The movement continues until a flange 59, having an insulating plate 60, closes spring contacts 61 and 62, thus switching on the flow of current to the coil 56. This causes reversal of the armature movement with acceleration, which exceeds the acceleration of the layer-surface friction force and thus provides the required motion impulse as it was described before. In a certain moment the contacts 61 and 62 are disconnected, while the core 55 continues to move back by inertia, until the spring 57 smoothly stops it and sends it forward again, beginning a new cycle. The amplitude of the core movement is controlled by a screw 63 that changes the position of contacts 61 and 62. To set up the acceleration in the passing direction the threaded bush 58 can be used and in the opposite direction a rheostat 64 can be used which changes the current of the coil 56. The number of consecutive impulses in a series is controlled by a switch 65 that can be connected to a timer, impulse generator, etc. The timer output can be modulated by a signal from a device which controls the furnace load.

The described grate stoker also can be used in combination with solid fuel sprinklers in which case the layer movement has to be reversed and the first section is installed from the rear side of the furnace. In this case no ash trough is required.

A grate stoker employing the inertial conveyor of the present invention has the following additional advantages:

Because the sections are moving synchronously, in phase, they have a different impulse amplitude. This causes layer cake pieces to crack in the moment they move from one section to anther. As a result there is no need to manually poke the layer to prevent the fuel from caking.

It shakes the layer, smoothing out the layer surface, eliminating piles and gaps, thus improving combustion.

The absence of a vertical component in the impulses causes even transportation of fuel without any segregation of particles by size which is a problem with vibrating stokers.

It will be understood by those skilled in the art that the novel conveyor of the present invention also can be used for conveying a variety of other materials, particularly when the accumulation of the material is required.

It also is to be understood that the foregoing description has been for purposes of illustration and that the invention is not to be limited by that description. For example, as previously mentioned in some applications it may be desirable to have a conveyor with only a single supporting or transporting surface or section as opposed to the plurality of sections described in the preferred embodiment. In addition, it will be appreciated that in place of the springs of the preferred embodiment other shifting means can be used including passive means such as resilient pads and active means such as solenoid drives, hydraulic drives and the like.

I claim:

1. An inertial conveyor having an immovable rest, a plurality of consecutive conveying surface sections slidably mounted on parallel rails for lateral movement toward said rest, the rear end of each of said sections covering the front end of the next section and the rear end of the last section covering the front end of the immovable rest, a plurality of springs operatively connected to said sections, said springs permitting said sections to shift back and forth towards each other and the immovable rest, and drive means for delivering lateral driving impulses to the sections thus forcing any material on the conveying surfaces of said sections to move by inertia towards the immovable rest, said drive means being operatively connected to only the first section and each of said sections other than the first section receiving lateral driving impulses from the previous section through said springs.

2. The inertial conveyor of claim 1 in which there is a pair of consecutive springs between each of the adjacent sections.

3. The inertial conveyor of claim 2 in which the pairs of springs are independently adjustable.

4. The inertial conveyor of claim 1 in which the drive means is a solenoid.

* * * * *